(12) United States Patent
Abe et al.

(10) Patent No.: US 10,316,967 B2
(45) Date of Patent: Jun. 11, 2019

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Kosuke Abe, Isehara (JP); Shin Tsukamoto, Isehara (JP); Seiichiro Takahashi, Isehara (JP); Hiroyasu Tanaka, Atsugi (JP)

(73) Assignees: JATCO Ltd, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 70 days.

(21) Appl. No.: 15/559,472

(22) PCT Filed: Feb. 3, 2016

(86) PCT No.: PCT/JP2016/053167
§ 371 (c)(1),
(2) Date: Sep. 19, 2017

(87) PCT Pub. No.: WO2016/152260
PCT Pub. Date: Sep. 29, 2016

(65) Prior Publication Data
US 2018/0119813 A1 May 3, 2018

(30) Foreign Application Priority Data

Mar. 20, 2015 (JP) .................. 2015-057518

(51) Int. Cl.
*F16H 59/40* (2006.01)
*F16H 61/662* (2006.01)
(Continued)

(52) U.S. Cl.
CPC ......... *F16H 61/66272* (2013.01); *F16H 9/18* (2013.01); *F16H 59/40* (2013.01);
(Continued)

(58) Field of Classification Search
CPC .......... Y10T 477/627; F16H 61/66272; F16H 61/0021; F16H 59/40; F16H 2061/66277;
(Continued)

(56) References Cited

U.S. PATENT DOCUMENTS 8,322,480 B2 * 12/2012 Yamaguchi ............ B60K 17/35
180/233
10,006,542 B2 * 6/2018 Abe ........................ F16H 59/40
(Continued)

FOREIGN PATENT DOCUMENTS

JP 2003-269591 A 9/2003

*Primary Examiner* — Roger L Pang
(74) *Attorney, Agent, or Firm* — Foley & Lardner LLP

(57) ABSTRACT

CVT controller has rotation speed sensors detecting driving and driven wheel rotation speed; driving and driven wheel speed difference detection unit detecting wheel speed difference $\Delta vfr$; and bad road judgment unit judging that road is bad road when $\Delta vfr$ is first value $\Delta vfr\_br$ or greater. CVT controller further has first belt clamping force increase unit increasing belt clamping force in case where road is judged to be bad road, as compared with case where road is not judged to be bad road; vibration detection unit detecting vehicle speed vibration fvsp; and second belt clamping force increase unit increasing belt clamping force when $\Delta vfr$ is second value $\Delta vfr\_psec$ or greater or when fvsp is third value fvsp_psec or greater in case where road is not judged to be bad road, as compared with case where $\Delta vfr$ is less than $\Delta vfr\_psec$ and case where fvsp is less than fvsp_psec.

6 Claims, 4 Drawing Sheets

(51) Int. Cl.
  *F16H 9/18*  (2006.01)
  *F16H 61/00*  (2006.01)
  *F16H 59/42*  (2006.01)
  *F16H 59/66*  (2006.01)
  *F16H 59/46*  (2006.01)
  *F16H 59/50*  (2006.01)

(52) U.S. Cl.
  CPC ..... *F16H 61/0021* (2013.01); *B60W 2520/28* (2013.01); *F16H 59/42* (2013.01); *F16H 59/46* (2013.01); *F16H 59/66* (2013.01); *F16H 2059/465* (2013.01); *F16H 2059/506* (2013.01); *F16H 2061/66277* (2013.01); *Y10T 477/624* (2015.01)

(58) Field of Classification Search
  CPC .... F16H 2059/506; F16H 59/46; F16H 59/66; B60W 2520/28
  USPC ......................................................... 701/65
  See application file for complete search history.

(56) References Cited

U.S. PATENT DOCUMENTS

2016/0363218 A1\* 12/2016 Sasaki ..................... F16H 59/66
2018/0202551 A1\* 7/2018 Dodo ............... F16H 61/66272

\* cited by examiner

CONTROL DEVICE FOR CONTINUOUSLY VARIABLE TRANSMISSION

The present invention relates to a control device for a continuously variable transmission.

BACKGROUND ART

As a technique that accurately judges a road surface condition and controls a pressure of a compression force (a belt clamping force) of a belt type continuously variable transmission properly according to an actual road surface condition, it has been disclosed in Patent Document 1. More specifically, a detection value of a rotation speed (the number of revolutions) of a driving wheel is subjected to a band-pass filter process, and a value obtained by this band-pass filter process is subjected to time total integration, then the road surface condition is judged according to this time total integration value. In a case where the road surface condition is judged to be a no-good road, the compression force is set to be higher than that of a case where the road surface condition is judged to be a good road.

In the technique of the Patent Document 1, however, since the band-pass filter process of the detection value is performed and the time total integration is also performed in order to accurately judge the road surface condition, it takes time to judge the road surface condition. And, even if the no-good road can be judged, a control to increase the compression force is delayed, then there is a risk that a belt slip will occur. For instance, on a road whose road surface friction coefficient (hereinafter, called µ) is uneven, immediately after the driving wheel slips at a low µ part, the driving wheel grips the road at a high µ part, and a torque inputted to the continuously variable transmission side is increased. If it takes time for judgment of the no-good road on such road surface, the control to increase the compression force is delayed also due to response delay of the hydraulic pressure, then as a problem, the slip between the belt and a pulley will occur.

CITATION LIST

Patent Document

Patent Document 1: Japanese Unexamined Patent Application Publication No. JP2003-269591

SUMMARY OF THE INVENTION

The present invention was made in view of the above technical problem. An object of the present invention is therefore to provide a control device for the continuously variable transmission which is capable of suppressing the belt slip regardless of the road condition.

In order to achieve the above object, a control device for a continuously variable transmission comprises: a first rotation speed sensor detecting a rotation speed of a driving wheel; a second rotation speed sensor detecting a rotation speed of a driven wheel; a wheel speed difference detection unit configured to detect a wheel speed difference between the driving wheel and the driven wheel from a detection value of the first rotation speed sensor and a detection value of the second rotation speed sensor; a bad road judgment unit configured to, when the wheel speed difference is equal to or greater than a first predetermined value, judge that a road on which a vehicle is travelling is a bad road; a first belt clamping force increase unit configured to, in a case where the road is judged to be the bad road, increase a belt clamping force when clamping a belt of the continuously variable transmission by pressure-controlled pulleys as compared with a case where the road is not judged to be the bad road; a vibration detection unit configured to detect a vehicle speed vibration value indicating a vibration of a vehicle speed on the basis of at least one of the detection values of the first rotation speed sensor and the second rotation speed sensor; and a second belt clamping force increase unit configured to, in a case where the road is not judged to be the bad road, when the wheel speed difference is equal to or greater than a second predetermined value that is smaller than the first predetermined value, or when the vehicle speed vibration value is equal to or greater than a third predetermined value, increase the belt clamping force as compared with a case where the wheel speed difference is less than the second predetermined value and a case where the vehicle speed vibration value is less than the third predetermined value.

According to the present invention, since the bad road judgment is carried out on the basis of the wheel speed difference of the rotation speed between the driving wheel and the driven wheel, the compression force (the belt clamping force) can be immediately increased when the driving wheel slips. Therefore, the belt slip caused by increase of the grip force of the driving wheel after the slip can be avoided. Further, even before detecting the bad road, since a possibility of occurrence of the belt slip is strong when the wheel speed difference is equal to or greater than the second predetermined value or the vehicle speed vibration value is equal to or greater than the third predetermined value, or since a possibility that subsequently the bad road will be judged is strong, by increasing the compression force (the belt clamping force) in this case, the belt slip can be suppressed.

EMBODIMENTS FOR CARRYING OUT THE INVENTION

[Embodiment 1]

An embodiment 1 of the present invention will be explained below with reference to the drawings. In the present specification, a "good road" means a pavement paved with asphalt or concrete. A "bad road (rough road)" means an unpaved road such as a gravel road and a cobblestone road. The bad road includes, in particular, from among the bad road, a road where an obstruction such as a large stone, a lumber (wood) and a curb and/or a road surface subsidence spot are present in a travelling direction, a road surface is rough or bumpy and a sudden torque is inputted to the transmission from the driving wheel. The "sudden torque" means a sudden large torque temporarily inputted to the transmission from the driving wheel, which occurs when an idling (or slipping) driving wheel contacts the road surface again when or after a vehicle overrides the obstruction.

Figure 1:
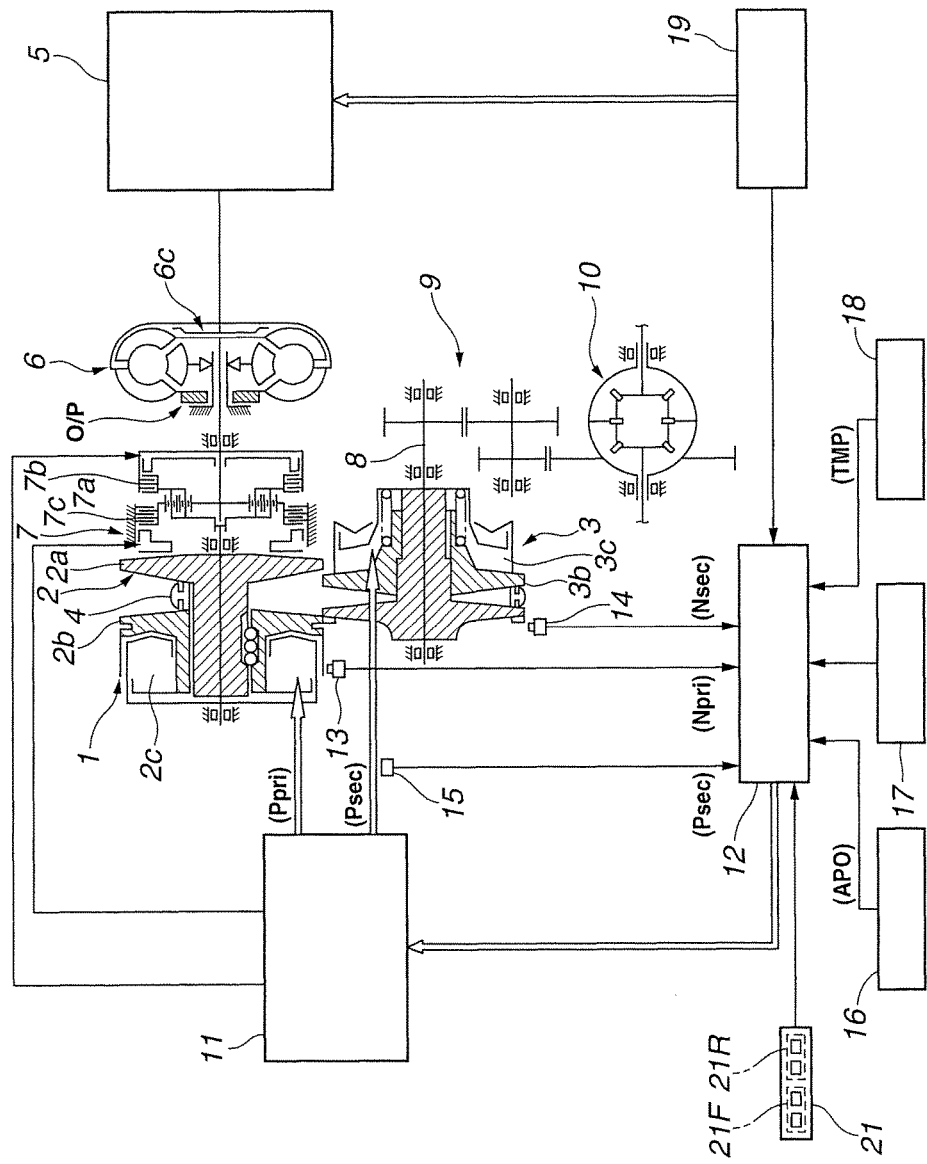
FIG. 1 is a system diagram showing a configuration of a control device for a continuously variable transmission according to an embodiment 1.

FIG. 1 is a system diagram showing a configuration of a control device for a continuously variable transmission according to the embodiment 1. A belt type continuously variable transmission (hereinafter, called "CVT") 1 is provided so that a V-groove of a primary pulley 2 and a V-groove of a secondary pulley 3 are aligned with each other, and a belt 4 is wound around the V-grooves between these pulleys 2 and 3. An engine 5 that is a drive source is coaxially aligned with the primary pulley 2. Between the engine 5 and the primary pulley 2, in an order from an engine 5 side, a torque converter 6 having a lock-up clutch 6c and a forward-reverse switching mechanism 7 are provided.

The forward-reverse switching mechanism 7 has, as a main element or component, a double pinion planetary gear set 7a. And its sun gear is connected to the engine 5 through the torque converter 6, and its carrier is connected to the primary pulley 2. The forward-reverse switching mechanism 7 further has a forward clutch 7b that directly connects the sun gear and the carrier of the double pinion planetary gear set 7a and a reverse brake 7c that fixes a ring gear. When the forward clutch 7b is engaged, an input rotation from the engine 5 is transmitted to the primary pulley 2 as it is through the torque converter 6. When the reverse brake 7c is engaged, the input rotation transmitted from the engine 5 through the torque converter 6 is reversed, and is transmitted to the primary pulley 2. A mechanical oil pump O/P is provided at a pump impeller side of the torque converter 6. This mechanical oil pump O/P is driven by the engine 5, and supplies a hydraulic pressure to an after-mentioned shift control hydraulic control circuit 11.

A rotation of the primary pulley 2 is transmitted to the secondary pulley 3 through the belt 4, and a rotation of the secondary pulley 3 is transmitted to a driving wheel (not shown) through an output shaft 8, a gear set 9 and a differential gear unit 10. In order to be able to change a transmission ratio between the primary pulley 2 and the secondary pulley 3 during transmission of power, one sides of conical plates forming the V-grooves of the primary pulley 2 and the secondary pulley 3 are stationary conical plates 2a and 3a, and the other sides are movable conical plates 2b and 3b that can move in the respective axial directions. These movable conical plates 2b and 3b are forced toward the stationary conical plates 2a and 3a by supplying a primary pulley pressure Ppri and a secondary pulley pressure Psec, which are produced with a line pressure being a source pressure, to a primary pulley chamber 2c and a secondary pulley chamber 3c. With this, the power transmission between the primary pulley 2 and the secondary pulley 3 is carried out by frictional connection of the belt 4 to and between the conical plates. When performing shift (speed change), by changing respective widths of the V-grooves of the primary pulley 2 and the secondary pulley 3 by a pressure difference between the primary pulley pressure Ppri and the secondary pulley pressure Psec which are produced according to a target transmission ratio and by continuously varying a winding arc diameter of the belt 4 with respect to the pulleys 2 and 3, the target transmission ratio is realized.

The primary pulley pressure Ppri and the secondary pulley pressure Psec, also an engagement pressure of the forward clutch 7b engaged upon selection of a forward travel range and an engagement pressure of the reverse brake 7c engaged upon selection of a reverse travel range, are controlled by the shift control hydraulic control circuit 11. The shift control hydraulic control circuit 11 performs the control in response to a signal from a transmission controller 12. The transmission controller 12 inputs a signal from a primary pulley rotation sensor 13 (corresponding to a third rotation speed sensor) that detects a rotation speed Npri of the primary pulley 2, a signal from a secondary pulley rotation sensor 14 that detects a rotation speed Nsec of the secondary pulley 3, a signal from a secondary pulley pressure sensor 15 that detects a secondary pulley pressure Psec, a signal from an accelerator operation amount sensor 16 that detects an operation amount APO of an accelerator pedal, a selection range signal from an inhibitor switch 17 that detects a position of a selection lever, a signal from an oil temperature sensor 18 that detects a working fluid temperature TMP of the CVT 1, a signal (such as an engine rotation speed and a fuel injection time) relating to an input torque Tq from an engine controller 19 that controls the engine 5, and a signal from a wheel speed sensor 21 (a wheel speed sensor 21F for a front wheel of the driving wheel, and a wheel speed sensor 21R for a rear wheel of a driven wheel) that detects a wheel speed of each wheel.

The transmission controller 12 calculates a wheel speed difference between the front and rear wheels from the wheel speed sensor 21F for the front wheel of the driving wheel and the wheel speed sensor 21R for the rear wheel of the driven wheel, and judges a bad road travelling (a rough road travelling) from a magnitude of the wheel speed difference. Then, when judged to be the bad road travelling, the transmission controller 12 executes a bad road-detected control process. The bad road-detected control process is a process in which the lock-up clutch 6c is released, torque capacities of the pulleys 2 and 3 are increased by outputting a command for increasing the secondary pulley pressure Psec (hereinafter, also called a compression force (or a belt clamping force)) to a bad road control pressure P1 to the shift control hydraulic control circuit 11, and a command (a fuel injection amount reduction command, an intake air amount reduction command etc.) for decreasing an output torque of the engine 5 is outputted to the engine controller 19 so that an input torque to the CVT 1 is smaller than the torque capacity of the pulley. Since the bad road judgment is carried out on the basis of the wheel speed sensor signal in this way, the compression force (the belt clamping force) can be immediately increased when the driving wheel slips, and a belt slip caused by increase of a grip force of the driving wheel after the slip can be avoided. Therefore, such a belt compression force that the belt 4 does not slip even if the input of the sudden torque is present is provided to the secondary pulley 3 and its torque capacity is increased, while the input torque to the CVT 1 is decreased, thereby effectively protecting the CVT 1 from the sudden torque.

Figure 2:
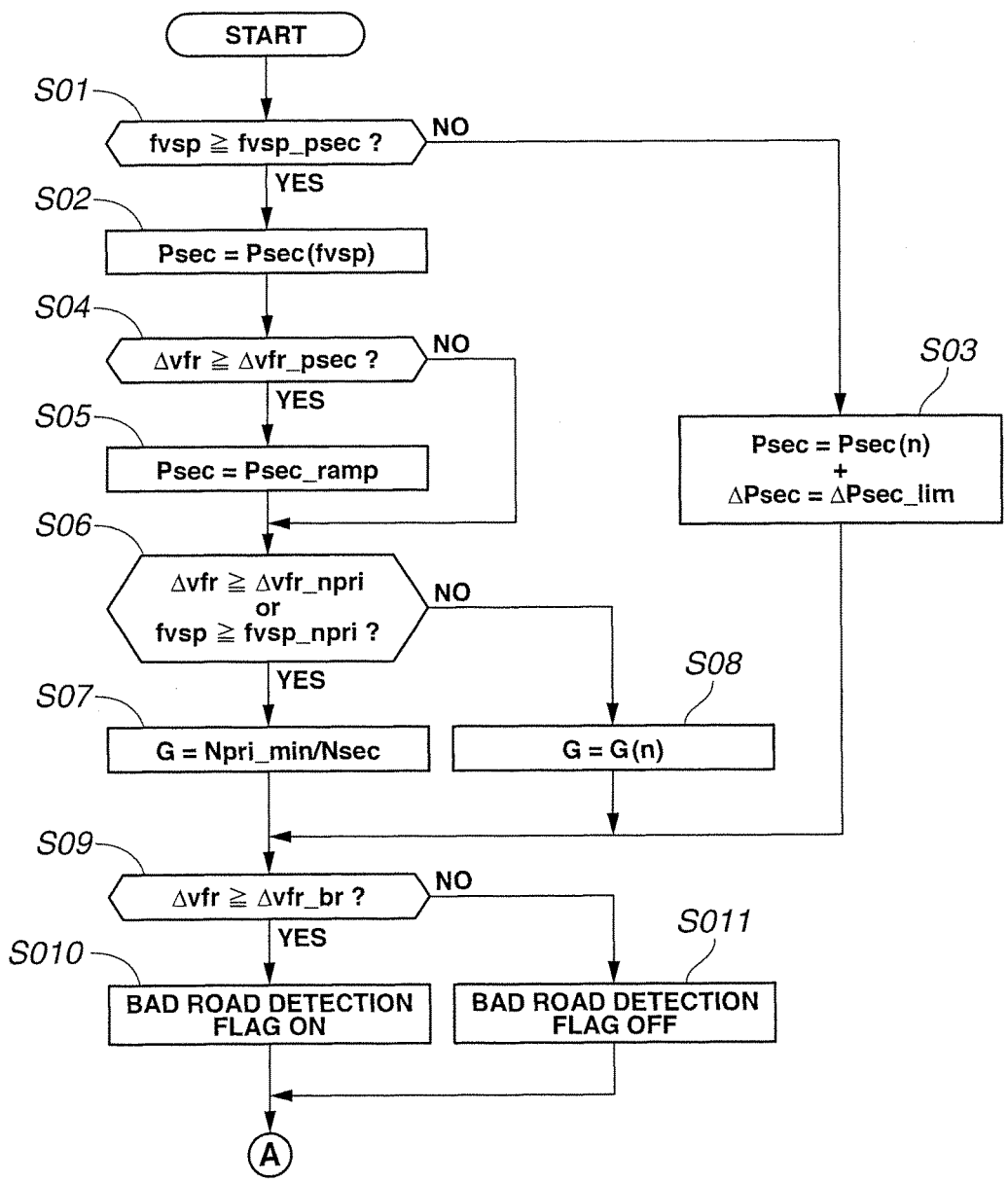
FIG. 2 is a flow chart showing a bad road (rough road) control process according to the embodiment 1.
Figure 3:
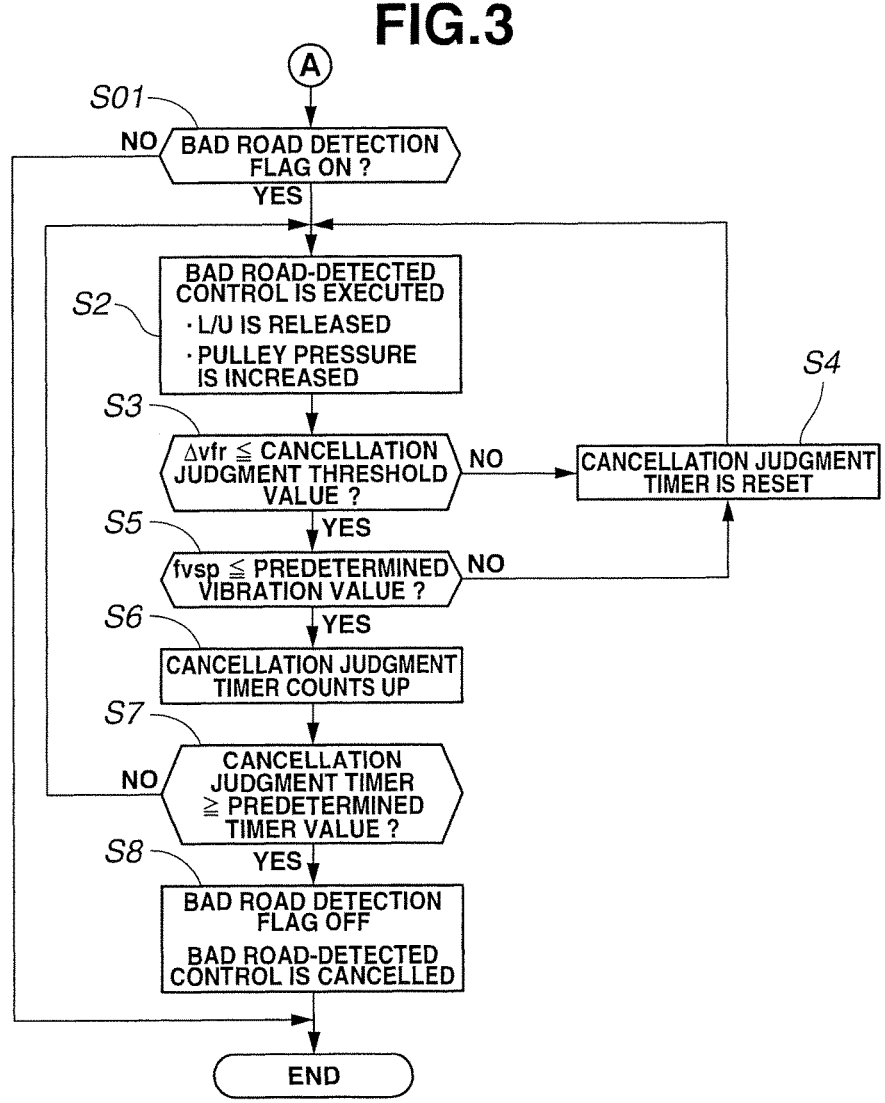
FIG. 3 is a flow chart showing a bad road (rough road) control process according to the embodiment 1.

FIGS. 2 and 3 are flow charts showing the bad road (rough road) control process according to the embodiment 1.

At step S01, a judgment is made as to whether or not a vehicle speed vibration fvsp is equal to or greater than a vehicle speed vibration reference secondary pressure lower limit regulation value (hereinafter, called fvsp_psec, corresponding to a third predetermined value). If the condition is satisfied, the routine proceeds to step S02. If the condition is not satisfied, the routine proceeds to step S03.

Figure 4:
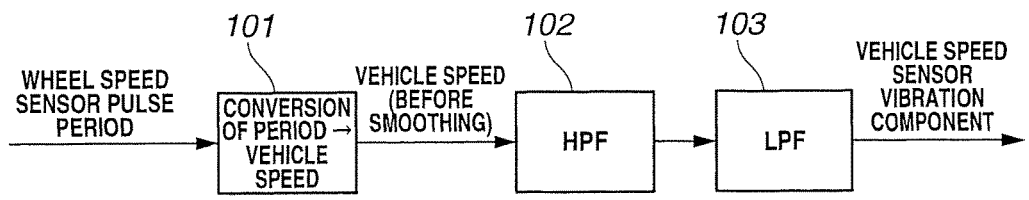
FIG. 4 is a control block diagram for executing a vehicle speed vibration component extraction process according to the embodiment 1.

Here, extraction of vehicle speed vibration component will be explained. FIG. 4 is a control block diagram for executing a vehicle speed vibration component extraction process according to the embodiment 1. A vehicle speed conversion unit 101 converts a wheel speed sensor pulse period (or a wheel speed sensor pulse cycle) inputted from the wheel speed sensor 21R into the vehicle speed. Because an operation cycle of the controller is fixed, it is possible to convert the number of pulses inputted within the operation cycle into the vehicle speed. Next, a high-pass filter 102 extracts only a high-frequency side signal from the converted vehicle speed signals and outputs it. Regarding a change of the vehicle speed when travelling on the good road, it changes only at a low frequency by an influence of an inertia of the vehicle. Therefore, the signal at the high-frequency side is considered to be a vibration component. A low-pass filter 103 smoothes the high-frequency side vehicle speed. Regarding the wheel, a frequency range in which the wheel can actually vibrate is limited due to an influence of an inertia of the wheel. Therefore, by removing noises by the low-pass filter 103 and extracting vibration that actually occurs at the wheel, the vehicle speed vibration fvsp that is the vibration component is extracted.

At step S02, the secondary pulley pressure Psec is set to Psec(fvsp) that is a value according to the vehicle speed vibration fvsp. More specifically, the secondary pulley pressure Psec is set so that the greater the vehicle speed vibration fvsp is, the greater the secondary pulley pressure Psec is. This is because even in a state in which a wheel speed difference Δvfr is not judged to be a no-good road at an after-mentioned step S06, there is apprehension that the belt slip will occur when the vehicle speed vibration fvsp actually becomes great.

At step S03, the secondary pulley pressure Psec is set to a secondary pulley pressure Psec(n) that is calculated according to a normal control. At this time, in a case where the secondary pulley pressure Psec is shifted to Psec(n) from a state in which the secondary pulley pressure Psec has been set to Psec(fvsp), the secondary pulley pressure Psec is shifted to Psec(n) with a secondary pulley pressure change rate ΔPsec being limited to a predetermined change rate ΔPsec_lim. With this, it is possible to avoid the belt slip caused by an abrupt change of the secondary pulley pressure Psec.

At step S04, a judgment is made as to whether or not the wheel speed difference Δvfr, which is a difference between a rotation speed of the driving wheel detected by the wheel speed sensor 21F and a rotation speed of the driven wheel detected by the wheel speed sensor 21R, is equal to or greater than a wheel speed difference reference secondary pressure lower limit regulation value (hereinafter, called Δvfr_psec, corresponding to a second predetermined value) that is smaller than an after-mentioned entry judgment threshold value Δvfr_br (corresponding to a first predetermined value) for a bad road detection. If the condition is satisfied, the routine proceeds to step S05. If the condition is not satisfied, the routine proceeds to step S06.

At step S05, the secondary pulley pressure Psec is set to a magnitude according to the wheel speed difference Δvfr. More specifically, a function connecting a current secondary pulley pressure Psec (Psec(fvsp) or Psec(n)) for Δvfr_psec and the bad road control pressure P1 for Δvfr_br is defined, and a ramp control is performed so that the greater the wheel speed difference Δvfr is, the more the secondary pulley pressure Psec is increase toward the bad road control pressure P1. Hereinafter, a secondary pulley pressure determined by this ramp control is termed Psec(fvsp, Δvfr).

That is, it can be said that as the wheel speed difference Δvfr gets closer to the after-mentioned entry judgment threshold value Δvfr_br, the wheel speed difference Δvfr becomes large, then a probability of judgment of the bad road is high. At this time, by previously increasing the secondary pulley pressure Psec according to the wheel speed difference Δvfr, there is no need to rapidly increase the secondary pulley pressure Psec to the bad road control pressure P1 when judged to be the bad road while avoiding the belt slip, and a response delay and oil vibration are prevented.

At step S06, a judgment is made as to whether or not the wheel speed difference Δvfr is equal to or greater than a wheel speed difference reference primary rotation speed lower limit regulation value (hereinafter, called Δvfr_npri, corresponding to a fourth predetermined value), or a judgment is made as to whether or not the vehicle speed vibration fvsp is equal to or greater than a vehicle speed vibration reference primary rotation speed lower limit regulation value (hereinafter, called fvsp_npri, corresponding to a fifth predetermined value). If the condition is satisfied, the routine proceeds to step S07. If the condition is not satisfied, the routine proceeds to step S08.

At step S07, a transmission ratio G of the CVT 1 is calculated on the basis of a predetermined primary pulley minimum rotation speed Npri_min and a current secondary pulley rotation speed Nsec (i.e. G=Npri_min/Nsec), and a minimum rotation limit regulation process that controls the CVT 1 toward this transmission ratio G is performed. This primary pulley minimum rotation speed Npri_min is such a value that even if the bad road control pressure P1 is required to use in the bad road control of the secondary pulley pressure Psec, a pump discharge pressure can surely be secured. Here, in a case where the minimum rotation limit regulation is performed before a start of the bad road control process and after that the bad road control process is started, the lock-up clutch 6c is released. In this case, in addition to the control of the transmission ratio G, by requiring the engine 5 to attain a rotation speed corresponding to the primary pulley minimum rotation speed Npri_min, the discharge pressure of the mechanical oil pump O/P is secured.

At step S08, the transmission ratio G of the CVT 1 is controlled according to a normal shift map.

Basically, in a travelling state, the lock-up clutch 6c of the torque converter 6 is in a lock-up state, and the rotation speed Npri of the primary pulley 2 of the CVT 1 and an engine rotation speed Ne are identical. Since the mechanical oil pump O/P is driven by the engine 5, if the engine rotation speed Ne is decreased when increasing the secondary pulley pressure Psec according to fvsp or Δvfr, there is a risk that an adequate oil pump discharge pressure will not be secured. Therefore, in order to secure the oil pump discharge pressure of the mechanical oil pump O/P, the primary pulley minimum rotation speed Npri_min is set, and the minimum rotation limit regulation process to control the transmission ratio G of the CVT 1 to achieve this rotation speed is performed. With this control, the primary rotation speed Npri is secured, which results in the engine rotation speed Ne being secured, then the oil pump discharge pressure of the mechanical oil pump O/P is secured, and the belt slip is prevented.

At step S09, a judgment is made as to whether or not the wheel speed difference Δvfr is equal to or greater than the bad road detection entry judgment threshold value Δvfr_br. If the condition is satisfied, the routine proceeds to step S010, and a bad road detection flag is set to ON. If the condition is not satisfied, the routine proceeds to step S011, and the bad road detection flag is set to OFF.

At step S1, a judgment is made as to whether or not the bad road detection flag is ON. If the bad road detection flag is ON, the routine proceeds to step S2. If the bad road detection flag is OFF, that is, if the road is the good road, the present control flow is ended.

At step S2, the bad road-detected control is executed. More specifically, the lock-up clutch 6c is released, and the secondary pulley pressure Psec is increased to the bad road control pressure P1.

At step S3, a judgment is made as to whether or not the wheel speed difference Δvfr is equal to or less than a cancellation judgment threshold value (corresponding to sixth and eighth predetermined values). If the wheel speed difference Δvfr is equal to or less than the cancellation judgment threshold value, the routine proceeds to step S5. If the wheel speed difference Δvfr is greater than the cancellation judgment threshold value, the routine proceeds to step S4. Here, in an abnormal condition of the wheel speed sensor 21, the wheel speed difference Δvfr is judged to be equal to or less than the cancellation judgment threshold value, and the routine proceeds to step S5. This is to prevent a situation in which the bad road-detected control cannot be cancelled in the abnormal condition of the wheel speed sensor 21. And, continuation of the bad road-detected control causes poor fuel economy.

At step S4, a cancellation judgment timer is reset, and the routine is returned to step S2, then the bad road-detected control is continued. Here, the cancellation judgment timer is a timer that counts up when the wheel speed difference Δvfr becomes equal to or less than the cancellation judgment threshold value. By permitting the cancellation during continuation of the state in which the wheel speed difference Δvfr is equal to or less than the cancellation judgment threshold value for a predetermined time period, hunting associated with the judgment is suppressed.

At step S5, a judgment is made as to whether or not the vehicle speed vibration fvsp is equal to or less than a predetermined vibration value (corresponding to seventh and ninth predetermined values). If the condition is satisfied, the routine proceeds to step S6. If the condition is not satisfied, the routine is returned to step S4, and the cancellation judgment timer is reset.

In the bad road control process of the embodiment 1, in order to increase a response of the bad road detection, the bad road judgment is performed using the wheel speed difference. Because of this, if a judgment to end the bad road-detected control is made only using the wheel speed difference, there is a risk that the bad road-detected control will be ended due to a temporary convergence of the wheel speed difference even when the road is actually the bad road. In this case, even if the bad road judgment is immediately performed again, a problem about a response of the pressure control for increasing the compression force (the belt clamping force) arises, and there is a risk that the compression force cannot be increased before an occurrence of the belt slip. For this problem, in the embodiment 1, the end judgment of the bad road-detected control is made by the vehicle speed vibration fvsp that is the vibration component of the vehicle speed, in addition to the wheel speed difference Δvfr, thereby preventing a situation in which the bad road-detected control is accidentally ended.

Here, in the abnormal condition of the wheel speed sensor 21, the vibration component is detected on the basis of the sensor pulse period detected by the primary pulley rotation sensor 13. Even if the transmission ratio is changed at this time, since frequency of its change is extremely low, an influence can be removed by the low-pass filter. And, in a case where a judgment is made as to whether or not vibration of the primary pulley 2 is equal to or less than a predetermined vibration value and the vibration is equal to or less than the predetermined vibration value, the routine proceeds to step S6. If the vibration is greater than the predetermined vibration value, the routine is returned to step S4, and the cancellation judgment timer is reset. That is, if the abnormal condition of the wheel speed sensor 21 occurs and the wheel speed difference detected regardless of the road surface condition is great, the compression force is increased by the bad road-detected control. In this case, the compression force cannot be returned to a low compression force of a normal state, then this causes poor fuel economy. Thus, in the abnormal condition of the wheel speed sensor 21, since the wheel speed difference is not used for the cancellation judgment, but only the vibration component of the primary pulley rotation sensor 13 is used for the cancellation judgment, it is possible to return the compression force to the low compression force of the normal state when the road condition becomes the good road, thereby suppressing poor fuel economy.

At step S6, the cancellation judgment timer counts up.

At step S7, a judgment is made as to whether or not a count value of the cancellation judgment timer is equal to or greater than a predetermined timer value. If the count value of the cancellation judgment timer is equal to or greater than the predetermined timer value, the routine proceeds to step S8. If the count value is less than the predetermined timer value, the routine is returned to step S2, and the bad road-detected control is continued.

At step S8, the bad road detection flag is set to OFF, and the bad road-detected control is cancelled. At this time, in a case where the primary pulley minimum rotation speed Npri_min set at step S07 is still continuously set, this primary pulley minimum rotation speed Npri_min is also canceled.

Figure 5:
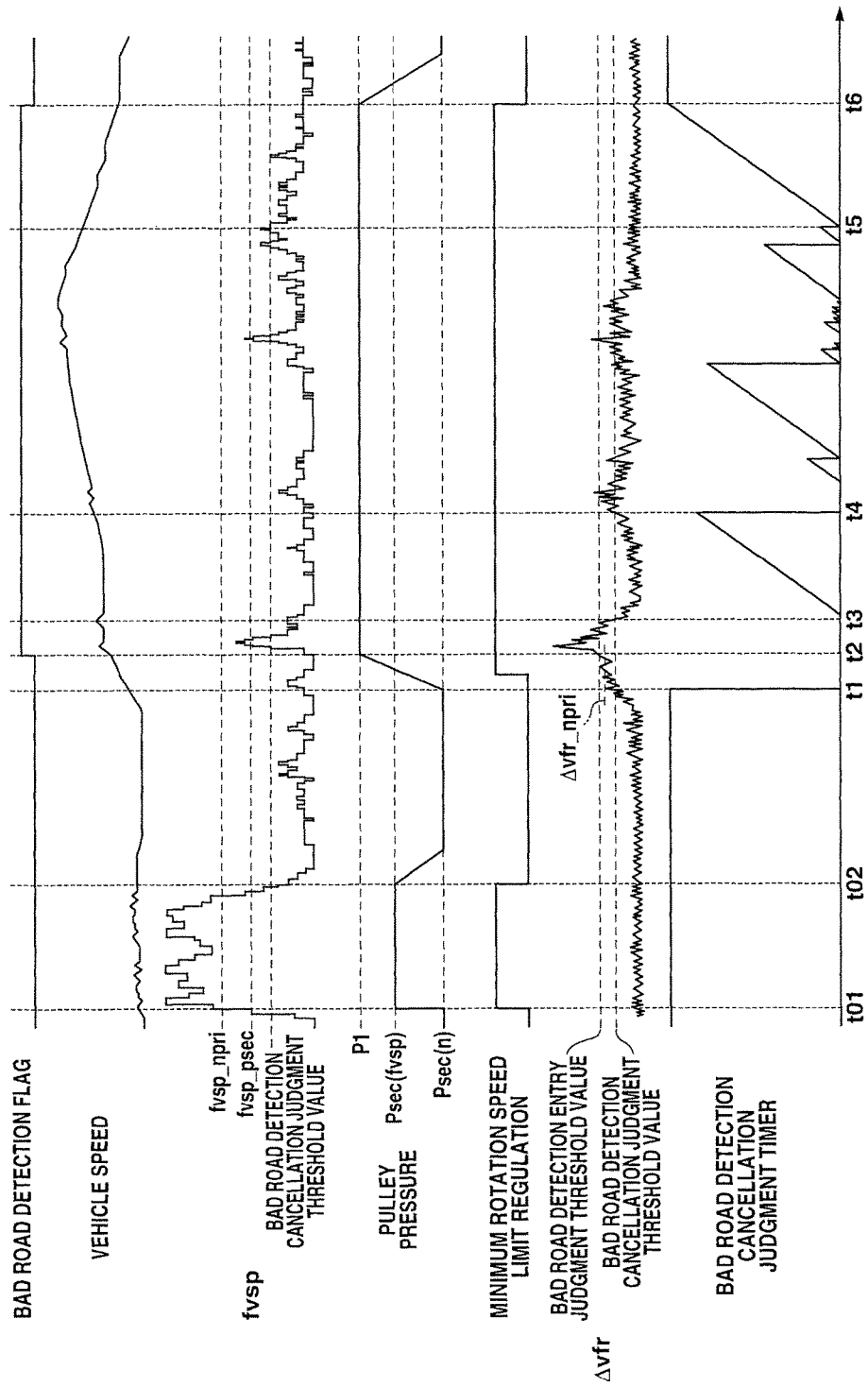
FIG. 5 is a time chart showing the bad road (rough road) control process according to the embodiment 1.

FIG. 5 is a time chart showing the bad road control process according to the embodiment 1. In an initial travelling state, the vehicle travels at a substantially constant speed, the bad road detection flag is OFF, and the cancellation judgment timer counts up to a certain timer value.

At time t01, when the vehicle speed vibration fvsp exceeds fvsp_psec, the secondary pulley pressure Psec is set to Psec(fvsp) that is the value according to the vehicle speed vibration fvsp. Further, since the vehicle speed vibration fvsp exceeds fvsp_npri at the same time, the transmission ratio G of the CVT 1 is calculated on the basis of the predetermined primary pulley minimum rotation speed Npri_min and a current secondary pulley rotation speed Nsec (i.e. G=Npri_min/Nsec), and the minimum rotation limit regulation process that controls the CVT 1 toward this transmission ratio G is performed.

At time t02, when the vehicle speed vibration fvsp becomes less than fvsp_psec and fvsp_npri, the minimum rotation limit regulation process is cancelled, and Psec(fvsp) is also changed to the secondary pulley pressure Psec(n) calculated according to the normal control. At this time, in order for the secondary pulley pressure Psec not to abruptly change, the secondary pulley pressure Psec is shifted with the secondary pulley pressure change rate ΔPsec being limited to the predetermined change rate ΔPsec_lim.

At time t1, when the vehicle enters the bad road and the wheel speed difference exceeds the cancellation judgment threshold value, the cancellation judgment timer is reset. Then, due to increase of the wheel speed difference Δvfr, since the wheel speed difference Δvfr exceeds Δvfr_psec, the secondary pulley pressure Psec is gradually increased by the ramp control. Further, when the wheel speed difference Δvfr exceeds Δvfr_npri, the minimum rotation limit regulation is performed.

At time t2, when the wheel speed difference Δvfr exceeds the bad road detection entry judgment threshold value Δvfr_br, the bad road detection flag is set to ON from OFF, and the bad road-detected control is executed. With this, the wheel speed difference goes toward a convergence direction. Since the bad road detection is carried out on the basis of the wheel speed difference in this way, a rapid or quick bad road detection becomes possible, then the belt slip can be suppressed.

At time t3, since the wheel speed difference becomes less than the cancellation judgment threshold value and the vibration component is less than the predetermined vibration value, count-up of the cancellation judgment timer is started.

At time t4, when the wheel speed difference exceeds the cancellation judgment threshold value again, since the count-up of the cancellation judgment timer is reset, the bad road detection flag is held ON as it is, and the bad road-detected control is continued. Since the bad road detection flag is set using the cancellation judgment timer in this way, it is possible to suppress a variation of the compression force (the belt clamping force) associated with operation and no-operation of the bad road-detected control.

At time t5, since the vehicle moves from the bad road to the good road and the vibration component is less than the predetermined vibration value and further the wheel speed difference is less than the cancellation judgment threshold value, count-up of the cancellation judgment timer is started.

Then, at time t6, when the count value of the cancellation judgment timer reaches the predetermined timer value, the bad road detection flag is set to OFF from ON, and the bad road-detected control is ended. Further, the secondary pulley pressure Psec also starts to decrease toward the normal control secondary pulley pressure Psec(n) at the predetermined change rate ΔPsec_lim, and the minimum rotation limit regulation process is also cancelled. In this way, at the cancellation of the bad road-detected control, by not only judging the wheel speed difference, but also judging the decrease of the vibration component, a stable cancellation judgment can be achieved.

As described above, the embodiment 1 can obtain the following effects.

(1) A control device for a continuously variable transmission comprises: a wheel speed sensor 21F (a first rotation speed sensor) detecting a rotation speed of a driving wheel; a wheel speed sensor 21R (a second rotation speed sensor) detecting a rotation speed of a driven wheel; step S04 (a wheel speed difference detection unit) configured to detect a wheel speed difference between the driving wheel and the driven wheel from a detection value of the wheel speed sensor 21F and a detection value of the wheel speed sensor 21R; step S09 (a bad road judgment unit) configured to, when the wheel speed difference is equal to or greater than an entry judgment threshold value Δvfr_br (a first predetermined value), judge that a road on which a vehicle is travelling is a bad road; step S2 (a first belt clamping force increase unit) configured to, in a case where the road is judged to be the bad road, increase a belt clamping force when clamping a belt of the continuously variable transmission by pressure-controlled pulleys as compared with a case where the road is not judged to be the bad road; step S01 (a vibration detection unit) configured to detect a vehicle speed vibration on the basis of the detection value of the wheel speed sensor 21R (at least one of the detection values of the first rotation speed sensor and the second rotation speed sensor); and step S02 or S05 (a second belt clamping force increase unit) configured to, in a case where the road is not judged to be the bad road, when the wheel speed difference Δvfr is equal to or greater than Δvfr_psec (a second predetermined value) that is smaller than the first predetermined value Δvfr_br at step S04, or when the vehicle speed vibration value fvsp is equal to or greater than fvsp_psec (a third predetermined value) at step S01, increase the belt clamping force as compared with a case where the wheel speed difference Δvfr is less than Δvfr_psec and a case where the vehicle speed vibration value fvsp is less than fvsp_psec.

That is, since the bad road judgment is carried out on the basis of the wheel speed difference Δvfr of the rotation speed between the driving wheel and the driven wheel, the compression force (the belt clamping force) can be immediately increased when the driving wheel slips. Therefore, the belt slip caused by increase of the grip force of the driving wheel after the slip can be avoided. Further, even before detecting the bad road, since a possibility of occurrence of the belt slip is strong when the wheel speed difference Δvfr is equal to or greater than Δvfr_psec or the vehicle speed vibration fvsp is equal to or greater than fvsp_psec, or since a possibility that subsequently the bad road will be judged is strong, by increasing the compression force (the belt clamping force) in this case, the belt slip can be suppressed.

(2) The CVT 1 (the continuously variable transmission) is a transmission in which the pulleys are pressure-controlled according to a discharge pressure of a mechanical oil pump O/P that is driven by an engine 5, and the control device has step S07 (a minimum rotation limit regulation unit) configured to, in the case where the road is not judged to be the bad road, when the wheel speed difference Δvfr is equal to or greater than Δvfr_npri (a fourth predetermined value) that is smaller than the entry judgment threshold value Δvfr_br at step S06, or when the vehicle speed vibration fvsp is equal to or greater than fvsp_npri (a fifth predetermined value) at step S06, limit a rotation speed of the engine 5 so as to be Npri_min (a predetermined minimum rotation speed) or more.

Basically, in a travelling state, the lock-up clutch 6c of the torque converter 6 is in a lock-up state, and the rotation speed Npri of the primary pulley 2 of the CVT 1 and an engine rotation speed Ne are identical. Since the mechanical oil pump O/P is driven by the engine 5, if the engine rotation speed Ne is decreased when increasing the secondary pulley pressure Psec according to fvsp or Δvfr, there is a risk that an adequate oil pump discharge pressure will not be secured. Therefore, in order to secure the oil pump discharge pressure of the mechanical oil pump O/P, the primary pulley minimum rotation speed Npri_min is set, and the minimum rotation limit regulation process to control the transmission ratio G of the CVT 1 to achieve this rotation speed is performed. With this control, the primary rotation speed Npri is secured, which results in the engine rotation speed Ne being secured, then the oil pump discharge pressure of the mechanical oil pump O/P is secured, and the belt slip is prevented.

(3) Npri_min is a predetermined constant value. Therefore, even if the minimum rotation limit regulation is carried out, the engine rotation speed is not changed, then an awkward or odd feeling which a driver is subjected to can be suppressed.

(4) Step S07 (the minimum rotation limit regulation unit) is configured to, when the regulation is started and the road is judged to be the bad road, continues the regulation until the wheel speed difference Δvfr is equal to or less than a cancellation judgment threshold value (a sixth predetermined value) that is smaller than vfr_npri and the vehicle speed vibration fvsp is equal to or less than a predetermined vibration value (a seventh predetermined value) that is smaller than fvsp_npri.

Therefore, the discharge pressure of the mechanical oil pump O/P can be adequately secured during execution of the bad road control process.

(5) The control device has step S8 (an increase cancellation unit) configured to, when the wheel speed difference $\Delta$vfr is equal to or less than a cancellation judgment threshold value (an eighth predetermined value) that is smaller than the entry judgment threshold value $\Delta$vfr_br and the vehicle speed vibration fvsp is equal to or less than a predetermined vibration value (a ninth predetermined value) that is smaller than fvsp_psec during increase of the belt clamping force by the bad road control process (the first belt clamping force increase unit), decrease the belt clamping force increased at step S2.

Since the increased compression force is decreased when the wheel speed difference $\Delta$vfr and the vehicle speed vibration fvsp become the respective predetermined values or less, it is possible to accurately judge that the vehicle gets out of the bad road. Further, it is possible to prevent the compression force from being decreased even in a case where the vehicle travels on such a road that the input torque is abruptly increased, then the belt slip can be avoided. Moreover, since the compression force is decreased to a compression force according to the good road when the wheel speed difference and the vehicle speed vibration converge, a time when the vehicle travels with the compression force being superfluously high even when returning to the good road can be shortened, thereby suppressing poor fuel economy.

[Embodiment 2]

Next, an embodiment 2 will be explained. Basic structure or configuration is the same as that of the embodiment 1. Thus, only different points will be explained.

In the embodiment 1, when performing the minimum rotation limit regulation at step S07, the predetermined primary pulley minimum rotation speed Npri_min is set. In contrast to this, in the embodiment 2, a minimum rotation speed Npri_min is set on the basis of the secondary pulley pressure Psec(fvsp, $\Delta$vfr) according to the vehicle speed vibration fvsp and/or the wheel speed difference $\Delta$vfr. More specifically, when the wheel speed difference $\Delta$vfr is less than $\Delta$vfr_psec, the secondary pulley pressure Psec is the secondary pulley pressure Psec(fvsp) according to the vehicle speed vibration fvsp. When the wheel speed difference $\Delta$vfr is equal to or greater than $\Delta$vfr_psec, the secondary pulley pressure Psec is the secondary pulley pressure Psec(fvsp, $\Delta$vfr) determined by the ramp control of step S05. When the secondary pulley pressure Psec is determined in this manner, a minimum rotation speed Npri_min(fvsp, $\Delta$vfr) required to secure this hydraulic pressure can be calculated from a specific discharge amount of the mechanical oil pump O/P. The transmission ratio G of the CVT 1 is calculated using this minimum rotation speed Npri_min (fvsp, $\Delta$vfr) (i.e. G=Npri_min(fvsp, $\Delta$vfr)/Nsec), and the CVT 1 is controlled toward this transmission ratio G. With this, it is possible to secure a minimum engine rotation speed according to the travelling state, thereby improving fuel economy.

In the embodiment 2, in addition to the effects of (1), (2), (4) and (5) of the embodiment 1, the following effects can be obtained.

(6) Npri_min(fvsp, $\Delta$vfr) (the predetermined minimum rotation speed) is set so that the greater the wheel speed difference $\Delta$vfr is, the higher the Npri_min(fvsp, $\Delta$vfr) is, or so that the greater the detected vehicle speed vibration fvsp is, the higher the Npri_min(fvsp, $\Delta$vfr) is.

Therefore, since the minimum engine rotation speed Ne according to the travelling state can be secured, there is no need to unnecessarily set the engine rotation speed Ne to be high, and the fuel economy can be improved.

Although the present invention has been explained on the basis of the embodiments 1 and 2, a specified configuration is not limited to the embodiments 1 and 2.

For instance, in the embodiment 1, the predetermined vibration value (the seventh predetermined value) and the cancellation judgment threshold value (the eighth predetermined value) which are the cancellation conditions of the bad road control process are respectively set to the same values as the predetermined vibration value (the seventh predetermined value) and the cancellation judgment threshold value (the sixth predetermined value) which are the cancellation conditions of the minimum rotation limit regulation. However, different values between the cancellation condition of the bad road control process and the cancellation condition of the minimum rotation limit regulation could be set. For instance, the value of the cancellation condition of the minimum rotation limit regulation could be set to be higher than that of the cancellation condition of the bad road control process, and the minimum rotation limit regulation is early cancelled.

The embodiment 1 shows an example in which the present invention is applied to a front-wheel-drive vehicle. However, the present invention can be applied to a four-wheel drive vehicle. In this case, since all wheels are driving wheels, there is a possibility that an adequate wheel speed difference will not be generated. Thus, in the bad road judgment at step S9, the following two conditions are provided.

(a) A case where an acceleration of each wheel is calculated and a state in which the acceleration is greater than an acceleration increase side entry judgment threshold value that is set when considering that the acceleration is increased due to the slip is continued for a predetermined time period.

(b) A case where an acceleration of each wheel is calculated and a state in which the acceleration is smaller than an acceleration decrease side entry judgment threshold value that is set when considering that the acceleration is decreased due to an obstruction is continued for a predetermined time period.

In this case, when any one of three conditions including the case where the wheel speed difference between the front and rear wheels is equal to or greater than the entry judgment threshold value is satisfied, the road is judged to be the bad road. With this, the bad road detection can be effectively performed. Here, when cancelling the bad road-detected control after the bad road judgment by the above conditions for the four-wheel drive vehicle, the bad road-detected control is cancelled by the conditions of the wheel speed difference and the vehicle speed vibration. With this, it is possible to immediately decrease the compression force (the belt clamping force) when returning to the good road or when mistakenly judged to be the bad road, thereby suppressing poor fuel economy.

The invention claimed is:

1. A control device for a continuously variable transmission comprising:
   a first rotation speed sensor detecting a rotation speed of a driving wheel;
   a second rotation speed sensor detecting a rotation speed of a driven wheel;

a wheel speed difference detection unit configured to detect a wheel speed difference between the driving wheel and the driven wheel from a detection value of the first rotation speed sensor and a detection value of the second rotation speed sensor;

a bad road judgment unit configured to, when the wheel speed difference is equal to or greater than a first predetermined value, judge that a road on which a vehicle is travelling is a bad road;

a first belt clamping force increase unit configured to, in a case where the road is judged to be the bad road, increase a belt clamping force when clamping a belt of the continuously variable transmission by pressure-controlled pulleys as compared with a case where the road is not judged to be the bad road;

a vibration detection unit configured to detect a vehicle speed vibration value indicating a vibration of a vehicle speed on the basis of at least one of the detection values of the first rotation speed sensor and the second rotation speed sensor; and a second belt clamping force increase unit configured to, in a case where the road is not judged to be the bad road, when the wheel speed difference is equal to or greater than a second predetermined value that is smaller than the first predetermined value, or when the vehicle speed vibration value is equal to or greater than a third predetermined value, increase the belt clamping force as compared with a case where the wheel speed difference is less than the second predetermined value and a case where the vehicle speed vibration value is less than the third predetermined value.

2. The control device for the continuously variable transmission as claimed in claim 1, wherein:

the continuously variable transmission is a transmission in which the pulleys are pressure-controlled according to a discharge pressure of a mechanical oil pump that is driven by a drive source, and the control device has a minimum rotation limit regulation unit configured to, in the case where the road is not judged to be the bad road, when the wheel speed difference is equal to or greater than a fourth predetermined value that is smaller than the first predetermined value, or when the vehicle speed vibration is equal to or greater than a fifth predetermined value, limit a rotation speed of the drive source so as to be a predetermined minimum rotation speed or more.

3. The control device for the continuously variable transmission as claimed in claim 2, wherein:

the predetermined minimum rotation speed is a predetermined constant value.

4. The control device for the continuously variable transmission as claimed in claim 2, wherein:

the predetermined minimum rotation speed is set so that the greater the wheel speed difference is, the higher the predetermined minimum rotation speed is, or so that the greater the detected vehicle speed vibration is, the higher the predetermined minimum rotation speed is.

5. The control device for the continuously variable transmission as claimed in claim 2, wherein:

the minimum rotation limit regulation unit is configured to, when the regulation is started and the road is judged to be the bad road, continues the regulation until the wheel speed difference is equal to or less than a sixth predetermined value that is smaller than the fourth predetermined value and the vehicle speed vibration is equal to or less than a seventh predetermined value that is smaller than the fifth predetermined value.

6. The control device for the continuously variable transmission as claimed in claim 1, wherein:

the control device has an increase cancellation unit configured to, when the wheel speed difference is equal to or less than an eighth predetermined value that is smaller than the first predetermined value and the vehicle speed vibration is equal to or less than a ninth predetermined value that is smaller than the third predetermined value during increase of the belt clamping force by the first belt clamping force increase unit, decrease the belt clamping force increased by the first belt clamping force increase unit.

* * * * *